US008349411B2

(12) United States Patent
Beck et al.

(10) Patent No.: US 8,349,411 B2
(45) Date of Patent: Jan. 8, 2013

(54) METHOD FOR PRODUCING RAISED STRUCTURES ON THE SURFACE OF A PENCIL

(75) Inventors: Udo Beck, Nürnberg (DE); Walter Oetter, Stein (DE); Gerhard Lugert, Nürnberg (DE)

(73) Assignee: Faber-Castell AG, Stein (DE)

(*) Notice: Subject to any disclaimer, the term of this patent is extended or adjusted under 35 U.S.C. 154(b) by 411 days.

(21) Appl. No.: 12/425,575

(22) Filed: Apr. 17, 2009

(65) Prior Publication Data

US 2009/0263589 A1 Oct. 22, 2009

(30) Foreign Application Priority Data

Apr. 17, 2008 (EP) .................................... 08007474

(51) Int. Cl.
*C08J 7/04* (2006.01)
*B43K 27/02* (2006.01)

(52) U.S. Cl. ........ 427/510; 427/508; 427/514; 427/517; 401/20

(58) Field of Classification Search .................. 427/508, 427/510, 514, 517; 401/20
See application file for complete search history.

(56) References Cited

U.S. PATENT DOCUMENTS 5,698,270 A * 12/1997 Rigamonti .................... 427/493
6,461,067 B1 10/2002 Beck et al.
6,837,637 B1 1/2005 Beck et al.
7,351,469 B2 4/2008 Beck et al.

FOREIGN PATENT DOCUMENTS

CN 1582416 A 2/2005
CN 1593941 A 3/2005
CN 101104764 A 1/2008
DE 10348070 B3 2/2005
EP 1 177 108 B1 2/2002
EP 1 300 451 A2 4/2003
EP 1 514 700 A2 3/2005
WO WO/00/69571 * 11/2000
WO 03048860 A1 6/2003

* cited by examiner

*Primary Examiner* — Ling Choi
*Assistant Examiner* — Gennadiy Mesh
(74) *Attorney, Agent, or Firm* — Laurence A. Greenberg; Werner H. Stemer; Ralph E. Locher

(57) ABSTRACT

A method for producing raised structures serving as grip nubs on a surface of a pencil, in which, with the help of a nozzle, a plastic preparation is applied. The plastic preparation includes a radiation-curable plastic mass and has the following composition:

| | |
|---|---|
| plastic mass formed from oligomer and monomer | 40% to 98% wt.; |
| photoinitiator system | 0.1% to 30% wt.; |
| amorphous silicon dioxide and/or micronized amide wax | 0.3% to 30% wt.; |
| colorant | 0% to 60% wt.; |
| filler | 0% to 60% wt.; and |
| further additives | 0% to 10% wt. |

13 Claims, 1 Drawing Sheet

METHOD FOR PRODUCING RAISED STRUCTURES ON THE SURFACE OF A PENCIL

CROSS-REFERENCE TO RELATED APPLICATION

This application claims the priority, under 35 U.S.C. §119, of European application EP 08 007 474.3, filed Apr. 17, 2008; the prior application is herewith incorporated by reference in its entirety.

BACKGROUND OF THE INVENTION

Field of the Invention

The invention relates to a method for producing raised structures on the surface of a pencil. A pencil is to be understood here as meaning a writing pencil, coloring pencil, cosmetic pencil or the like. Such pencils have a shaft formed of wood or of plastic. In order to improve the handling of the pencil, in particular holding of the pencil during its use, raised structures made of a material which is easy to grip are applied to the pencil or shaft surface. The material here is flowable in the starting state and solidifies following application. Particularly when producing a pattern formed from a large number of relatively small structures, such as a nub pattern, in order to achieve a precise appearance, it is necessary for all of the structures to have exactly the same outline shape, height and contour. In order to ensure this, a material is required which, following application to the pencil surface, has only a slight tendency to flow and solidifies as quickly as possible. The requirements on the material are therewith still not exhausted. In order to allow nontiring handling of the pencil, it must be easy to grip and have pleasant haptic properties even in the case of sweaty hands. Furthermore, it has to adhere to pencils which are manufactured from highly diverse materials, for example to ones made of plastics such as ABS, PP and PS or unpainted or painted wood. An important aspect for the suitability of a material for raised structures is, finally, also its processability. The best material for haptic properties, surface adhesion and ease of grip cannot be used if it can only be processed with difficulty in a production method adjusted to the most cost-effective production possible, and the precise appearance of raised structures required for successful marketing cannot be achieved.

Published, European patent application EP 1 177 108, corresponding to U.S. Pat. No. 6,461,067, discloses a wood-encased pencil whose raised structures are produced by applying an aqueous polymer dispersion or a mixture of such dispersions which when it hardens, is water-resistant. Pencils which are coated with such a material have to be stored in drying rooms for up to two days following application. Accordingly, in order to be able to accommodate continuous production, large drying rooms are required, which is associated with high operating costs. The long drying time arises from the slow rate of evaporation of the water in the aqueous plastic dispersions, the large layer thickness and the skin formation which occurs during drying. The raised structures obtained by this method are in themselves able to fulfil their purpose, although their production is complex and accordingly expensive.

A drying step is also required in the method known e.g. from Published, European patent EP 1 514 700 A2, corresponding to U.S. Pat. No. 6,837,637, which uses systems containing organic solvents for the raised structures. The drying does proceed here more rapidly than in the case of aqueous systems. Apart from the technical complexity of avoiding contamination of the workplace with solvent vapors, the volatility of the solvents presents manufacturing problems. There is, for example, the risk that the ability of application devices to function is adversely affected by drying-on material. Particularly if the aim is to produce nubs which protrude a relatively long distance from the pencil surface, nozzles are particularly suitable for the application devices, since large amounts of material can be applied therewith. However, if the exit openings of the nozzles are constricted by drying-on nub material, this influences the size and shape of the nubs, and thus the desired appearance of the nub pattern. In order to prevent this, it may be necessary to interrupt the production process in order to clean the application devices.

European patent application EP 1 514 700 A2 also describes a method in which a radiation-curable solvent-free plastic preparation is applied in screen printing to the surface of wooden pencils. Afterwards, the pencils are immediately subjected to UV irradiation, where virtually immediately curing of the applied structures occurs. With the screen printing method, the amount of material to be applied to one position of the pencil surface is limited, meaning that grip nubs of a relatively large height, i.e. grip nubs which protrude a relatively long distance from the pencil surface, cannot be produced thereby. For this purpose, nozzles are more suitable.

In experiments using such preparations to produce grip nubs with the help of nozzles, it was found that upon applying such material drops using nozzles, stringing resulted. This caused the shape of the nubs to become irregular. Moreover, contamination of the pencil surface and of the nozzles by parts of threads adhering thereto sometimes resulted. Furthermore, it was found that the applied material drops exhibited a strong tendency to flow, which, inter alia, leads to an irregular untidy appearance of the applied nub pattern.

SUMMARY OF THE INVENTION

It is accordingly an object of the invention to provide a method for producing raised structures on a surface of a pencil that overcomes the above-mentioned disadvantages of the prior art devices of this general type, which can be carried out without problems from a processing point of view and which is suitable in particular for producing grip nubs which protrude markedly from the pencil surface, especially on plastic pencils or shafts.

With the foregoing and other objects in view there is provided, in accordance with the invention, a method for producing raised structures serving as grip nubs on a surface of a pencil. The method includes applying, with an aid of a nozzle, a drop of a plastic preparation on the surface of the pencil for producing the raised structures. The plastic preparation contains a radiation-curable plastic mass and has a composition of:

| | | |
|---|---|---|
| a) | a plastic mass formed from | 40% to 98% wt.; |
| b) | oligomer and monomer | |
| c) | photoinitiator system | 0.1% to 30% wt.; |
| d) | amorphous silicon dioxide | 0.3% to 30% wt.; |
| e) | and/or micronized amide wax | |
| f) | colorant | 0% to 60% wt.; |
| g) | filler | 0% to 60% wt.; and |
| h) | further additives | 0% to 10% wt. |

Then the raised structures are irradiated for curing.

According to the invention, with the help of a nozzle, a flowable plastic preparation is applied which is composed of 40% to 98% wt. of oligomer and a reaction diluent or a monomer as a radiation-curable plastic mass, 0.1% to 30% wt. of a photoinitiator system, 0.3% to 30% wt. of amorphous silicon dioxide and/or micronized amide wax, 0% to 59% wt. of a colorant, 0% to 60% wt. of a filler and 0% to 10% wt. of further additives. The reactive monomer diluent present in the plastic preparation dilutes the oligomer, and in this regard thus acts like an organic solvent. However, differently to this, it bonds chemically to the oligomer meaning that it cannot be removed or does not have to be removed again by a drying process, as is the case for the organic solvent. The amorphous silicon dioxide is flocculant aggregates of $SiO_2$ particles produced in a flame. Micronized amide waxes are waxes whose primary particles have a particle size of from 5 μm to 30 μm.

It was completely surprising that in the case of the type of application under discussion, the production disadvantages described above could be circumvented, the decisive factor here being the presence of an amorphous silicon dioxide and/or a micronized amide wax in the preparation.

During a production process carried out by the method according to the invention, the plastic preparation leaving the nozzle flows extremely uniformly to form a smooth drop surface, but without flowing further and spreading uncontrollably, resulting in a nub pattern of very uniformly shaped nubs. When the nozzle is removed from a drop of the plastic preparation applied to the pencil surface, it detaches from the preparation, without thereby resulting in stringing, i.e. the formation of a material thread which becomes thinner with increasing removal of the nozzle and finally breaks off. If such threads soil the pencil surface, the pencil has to be discarded as a reject. The threads would also contaminate the nozzles, which would mean corresponding cleaning expenditure and shut-down times during the continuous production.

On account of curing in a matter of seconds following treatment in particular with UV radiation, a separate drying room is no longer required. In the process, the pencils are subjected to virtually no thermal stress, meaning that it is possible to process pencils with temperature-sensitive shafts and/or leads.

Furthermore, radiation-curable compositions have the great advantage that no drying on tools can take place provided there is no exposure by UV light. If deposits form on tools and devices after prolonged processing times, these can be removed again by purely mechanical measures.

The proposed compositions are further advantageous in that, on account of the freedom from water, corrosion of device components which come into contact with a preparation is not to be feared.

Finally, it is also advantageous that on account of the lack of an organic solvent, an increase in the viscosity of the preparation during the production method due to evaporation of the solvent is ruled out.

Good results with regard to processability, ease of grip, and adhesion are achieved with preparations which contain, as a radiation-curable plastic mass, at least one acrylate oligomer with a fraction of from 70% to 80% wt. and at least one acrylate monomer with a fraction of from 1% to 25% wt. and a photoinitiator system with a fraction of from 1% to 8% wt. Suitable acrylate oligomers are in particular those from the group aromatic and aliphatic epoxy acrylates, polyester-, polyurethane-, oligoether- and amine-modified oligoether polyol acrylates.

However, the best results are achieved with preparations which comprise 70% to 80% wt. of urethane acrylate oligomer and 1% to 15% wt. of acrylate monomer and preferably 0.5% to 5% wt. of amorphous silicon dioxide and/or micronized amide wax. In all cases, a photoinitiator system is preferably composed of 0.5% to 5% wt. of a photoinitiator and 0.5% to 3% wt. of a coinitiator. The processability of the preparation can also be improved by adding a flow agent and lubricant with a fraction of from 0.3% to 2% wt. and of an antifoam with a fraction of from 0.1% to 1% wt. In particular, the specified constituents have a favorable effect with regard to a smooth surface of the grip nubs.

For a pencil which is produced in the manner described above, the plastic preparation can contain a filler, which is preferably selected from the group kaolin, talc, barium sulfate, titanium white, calcium carbonate and mica. Of particular suitability for influencing the tactile properties of the surfaces of the raised structures are fillers from the group aluminum silicate hollow balls, expanded hollow balls, polyurethane softfeeling beads, micronized plastics such as polypropylene or PTFE and PE waxes.

The adhesion of the plastic preparation to various plastics, such as ABS, PS or PP, can, if appropriate, be improved by pretreating the plastic surfaces. Of suitability are, for example, flame treatment, corona treatment and also plasma treatment.

Other features which are considered as characteristic for the invention are set forth in the appended claims.

Although the invention is illustrated and described herein as embodied in a method for producing raised structures on a surface of a pencil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
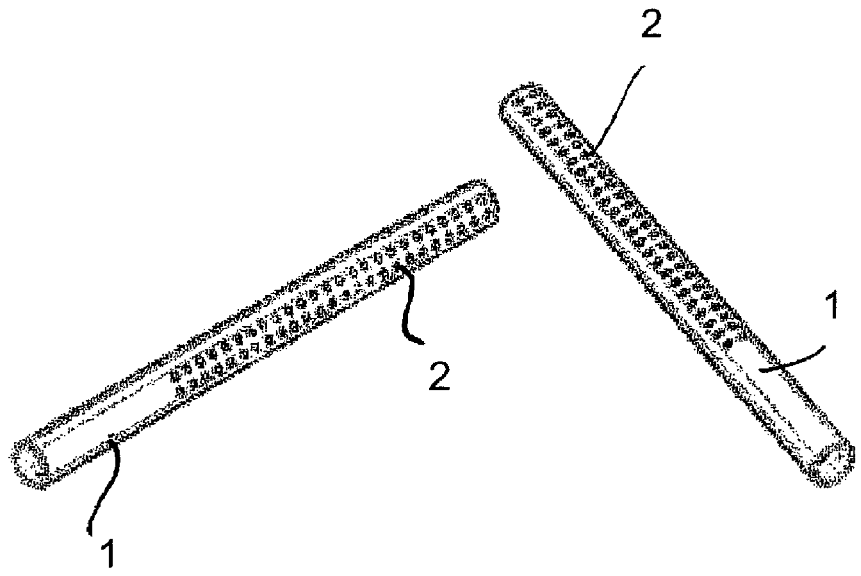
FIG. 1 is a diagrammatic, perspective view of two plastic shafts with grip nubs according to the invention.
Figure 2:
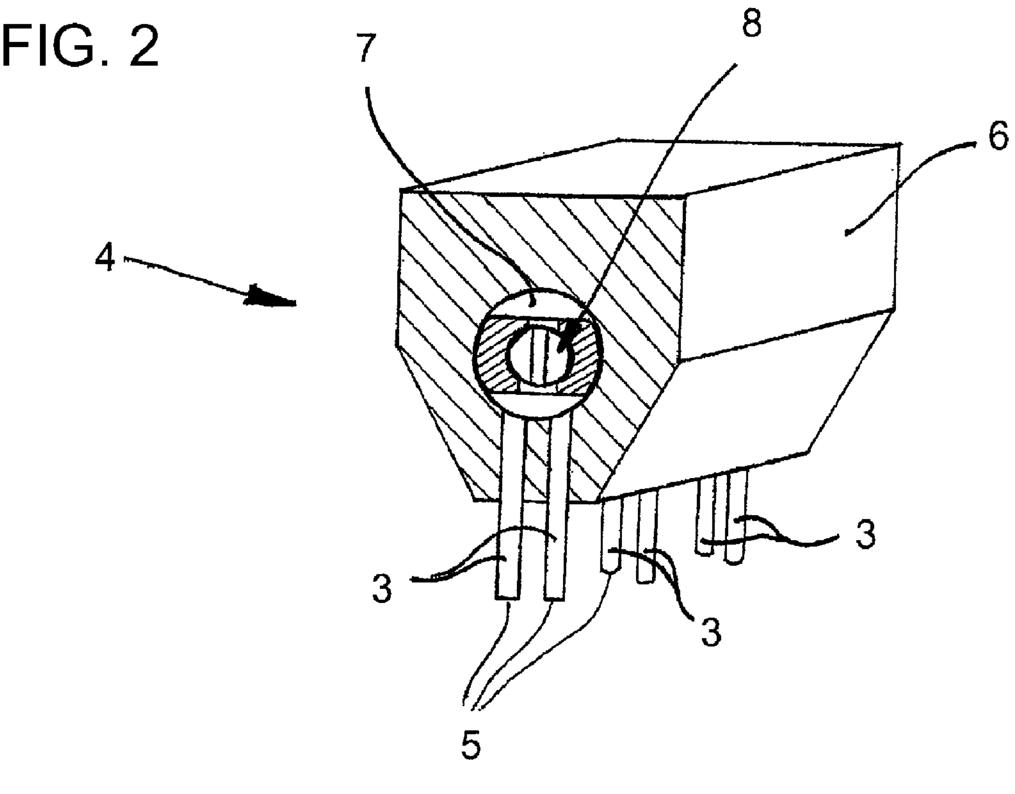
FIG. 2 is a diagrammatic, perspective view of an application device.

Referring now to the figures of the drawing in detail and first, particularly, to FIG. 1 thereof, there is shown two plastic shafts 1 having a trigonal outline shape, onto whose surface series of grip nubs 2 have been applied with the help of a device of the type shown in FIG. 2. The grip nubs project from the surface essentially in the radial direction with a height of up to 0.6 mm. Their width or diameter is about 2 mm. Instead of nubs, it is also possible to apply other structures to the surface of the plastic shaft, for example strip-shaped, punctiform or any other structures extending in the longitudinal direction of the pencil. The raised structures or nubs can be applied either to an untreated plastic surface or else to one provided with a coat of paint. The plastic shafts serve, for example, for the production of mechanical pencils, such as retractable pencils and the like. Besides the specified plastic shafts, surfaces of wood pencils can naturally also be provided with raised structures.

The raised structures—for reasons of simplicity, the term used below is grip nubs—are applied to the respective surfaces with the help of nozzles 3, which are part of an application device 4. To produce the grip nubs shown in FIG. 1 with a circular outline shape, nozzles 3 with a circular opening cross section 5 are used. The nozzles 3 are arranged on a nozzle carrier 6 corresponding to the desired nub pattern, in the present case thus in two rows. Within the nozzle carrier 6 there is a cavity 7 with which the nozzles 3 are in fluidic connection and which is charged with a plastic preparation via a central inlet channel (not shown). In order to achieve the most uniform distribution of the material stream as possible on the nozzles 3, a corresponding device 8 is present within the cavity 7. For construction details, reference is made to German patent DE 101 03 375 C1. Using a device of the type shown in FIG. 2 it is possible to produce a large number of equally sized grip nubs in a simple manner virtually with one shot. However, removing the nozzles 3 following the delivery of the plastic preparation onto the surface of pencils or pencil shafts and also the flow of the preparation between the application time and the irradiation with radiation which brings about curing of the plastic mass are problematic.

Some exemplary formulations with which the specified effects can be avoided are given below. The percentage data in these examples refers to the plastic mass in the liquid, i.e. not yet hardened, starting state. All of the percentage data is percent by weight, unless stated otherwise.

EXAMPLE 1

UV-crosslinkable plastic preparations for transparent or colorless grip nubs with a diameter of 2 mm and a height of 0.5 mm for plastic shafts.

| Raw material | Function | A | B | C |
|---|---|---|---|---|
| Roskydal UA VP LS 2258 (Bayer Material Science) | aliphatic urethane acrylate, oligomer | 77.3% | 57.3% | 57.3% |
| Roskydal UA XP 2491 (Bayer Material Science) | aliphatic urethane acrylate, oligomer | 20% | 20% | 20% |
| Laromer TPGDA (BASF) | tripropylene glycol triacrylate, reactive monomer diluents | — | 20% | 18% |
| Irgacure 2959 (Ciba) | alpha-hydroxyketone, photoinitiator | 2% | 2% | 2% |
| HDK T30 (Wacker Chemie AG) | amorphous silicon dioxide | — | — | 2% |
| Tego Glide 440 (Evonik) | surfactant, flow agent and lubricant | 0.5% | 0.5% | 0.5% |
| Byk 021 (BYK-Chemie) | Antifoam | 0.2% | 0.2% | 0.2% |

Following the application of the grip nubs to plastic shafts, irradiation with UV light is carried out for the crosslinking and then the application properties are assessed.

| Assessment criterion | Example A | Example B | Example C |
|---|---|---|---|
| Stringing upon application | + | ++ | ++++ |
| Flow of the nubs prior to curing | ++ | + | +++++ |
| Adhesion to ABS | ++++ | ++++ | ++++ |
| Through-curing | +++++ | +++++ | +++++ |

Assessment scheme:
+++++ = very good
++++ = good
+++ = acceptable
++ = poor
+ = very poor
n.u. = not usable The preparation according to example A exhibited very severe stringing. It was also a relatively thick-liquid, which made the entire application process more difficult. The applied droplets exhibited too little flow, meaning that the desired diameter of the grip nubs was not achieved. On account of the low flow, the grip nubs were also too high. The preparation according to example B exhibited only slightly improved stringing compared with A, although the applied mass had a considerably excessive flow, resulting in grip nubs with an irregular outline shape, relatively large width and too low a height. By contrast, the preparation according to example C, which contains an amorphous silicon dioxide, exhibited a flow of the droplets applied to the surface assessed as "very good". Very good here means that the droplets only flow sufficiently for the grip nubs to have the intended diameter following UV curing. Stringing, which is always present to a certain extent in plastic preparations of the present type, was significantly reduced compared to preparations A and B and even to the extent that it neither impairs the three-dimensional shape and surface smoothness of the grip nubs, nor that as a result the surface of the pencil shaft would have been contaminated. The adhesion on ABS was good for all three examples, the through-curing was very good.

EXAMPLE 2

UV-crosslinkable plastic preparation for black-colored grip nubs with dimensions as in example 1.

| Raw material | Function | D | E | F | G | H | I |
|---|---|---|---|---|---|---|---|
| Roskydal UA VP LS 2258 (Bayer Material Science) | aliphatic urethane acrylate, oligomer | 75.8% | 54.8% | 54.8% | 54.8% | 73.8% | 52.8% |
| Roskydal UA XP 2491 (Bayer Material Science) | aliphatic urethane acrylate, oligomer | 20% | 20% | 20% | 20% | 20% | 20% |

-continued

| Raw material | Function | D | E | F | G | H | I |
|---|---|---|---|---|---|---|---|
| Laromer TPGDA (BASF) | tripropylene glycol triacrylate, reactive monomer diluent | — | 20% | 18% | 18% | — | 20% |
| Irgacure 2959 (Ciba) | alpha-hydroxyketone, photoinitiator | 2% | 2% | 2% | 2% | 2% | 2% |
| Irgacure 819 (Ciba) | bis-acyl-phosphine, co-photoinitiator | 1% | 1% | 1% | 1% | 1% | 1% |
| HDK T30 (Wacker Chemie AG) | amorphous silicon dioxide, rheological additive | — | — | 2% | — | 2% | 1% |
| Helio Beit UV 904 (Bollig & Kemper) | carbon black preparation, pigment | 0.5% | 0.5% | 0.5% | 0.5% | 0.5% | 0.5% |
| CrayVallac Super (Cray Vallay) | micronized amide wax, rheological additive | — | — | — | 3% | — | 2% |
| Tego Glide 440 (Evonik) | surfactant, flow agent and lubricant | 0.5% | 0.5% | 0.5% | 0.5% | 0.5% | 0.5% |
| Byk 021 (BYK-Chemie) | antifoam | 0.2% | 0.2% | 0.2% | 0.2% | 0.2% | 0.2% |

Following the application of structures onto plastic shafts, irradiation with UV light is carried out for the crosslinking and then the coating properties are assessed.

| Assessment criterion | Example D | Example E | Example F | Example G | Example H | Example I |
|---|---|---|---|---|---|---|
| Stringing upon application | + | ++ | ++++ | ++++ | n.u. | ++++ |
| Flow of the nubs prior to curing | ++ | + | +++++ | +++++ | n.u. | +++++ |
| Adhesion to ABS | ++++ | ++++ | ++++ | ++++ | n.u. | ++++ |
| Through-curing | +++++ | +++++ | +++++ | +++++ | n.u. | +++++ |

(for assessment scheme see above!)

In the case of preparation D, severe stringing was evident, it was too thick-liquid for an application. The applied droplets exhibited much too little flow. Conditions as for the preparation A mentioned above were present here. Preparation E exhibited only slightly improved stringing compared to D, coupled with a considerably excessively strong flow. The result of the experiments was thus comparable with that carried out with preparation B. Preparations F and G, which comprised amorphous silicon dioxide and micronized amide wax, respectively, exhibited a flow of the droplets assessed both as "very good" and also barely any stringing; conditions were thus present as for the aforementioned preparation C. The adhesion onto ABS was good for all four examples, the through-curing was very good. Preparation H was extremely difficult to handle merely because its viscosity was too high. Even when it was possible to apply a material drop to a pencil surface, severe stringing resulted. This preparation was therefore assessed as n.u. In the case of preparation 1, micronized amide wax was added as well as amorphous silicon dioxide. Here, results were obtained as for preparation G. In summary, it can therefore be established that with both substances—alone or in a mixture—good results with regard to flow and stringing of the applied preparation arise, with precisely the combination of a reactive monomer diluent or monomer and the specified substances being mandatorily required.

The invention claimed is:

1. A method for producing raised structures serving as grip nubs on a surface of a pencil, which comprises the steps of:

applying, with a nozzle, a drop of a plastic preparation on the surface of the pencil for producing a respective one of the raised structures, removing the nozzle from the drop of plastic applied onto the surface of the pencil for detaching the nozzle from the preparation without stringing, and radiating the drop for curing the drop, the plastic preparation containing a radiation-curable plastic mass and has a composition of a plastic mass formed from:

| | | |
|---|---|---|
| oligomer and monomer | 40% to 98% | wt.; |
| photoinitiator system | 0.1% to 30% | wt.; |
| amorphous silicon dioxide and/or micronized amide wax | 0.3% to 30% | wt.; |
| colorant | 0% to 60% | wt.; |
| filler | 0% to 60% | wt.; |
| further additives | 0% to 10% | wt.; and |

irradiating the raised structures for curing.

2. The method according to claim 1, which further comprises forming the plastic preparation to contain at least one acrylate oligomer.

3. The method according to claim 2, which further comprises forming the plastic preparation to contain 70% to 80% wt. of the acrylate oligomer and 1% to 25% wt. of an acrylate monomer.

4. The method according to claim 2, which further comprises forming the plastic preparation with the acrylate oligomer selected from the group consisting of aromatic and aliphatic epoxy acrylates, polyester-, polyurethane-, oligoether-, amine-modified oligoether and polyol acrylates.

5. The method according to claim 4, which further comprises forming the plastic preparation to have 70% to 80% wt. of urethane acrylate oligomer, and 1% to 15% wt. of acrylate monomer.

6. The method according to claim 1, which further comprises forming the plastic preparation with 1% to 8% wt. of the photoinitiator system.

7. The method according to claim 6, which further comprises forming the plastic preparation with 0.5% to 5% wt. of a photoinitiator and 0.5% to 3% wt. of a coinitiator.

8. The method according to claim 1, which further comprises forming the plastic preparation with at least one of 0.5% to 5% wt. of amorphous silicon dioxide and micronized amide wax.

9. The method according to claim 8, which further comprises applying the radiation-curable plastic mass to the surface of the pencil, the radiation-curable plastic mass has a composition as follows:

| | | |
|---|---|---|
| urethane acrylate oligomer | 70%-80% | wt.; |
| acrylate monomer | 1%-15% | wt.; |
| at least one of amorphous silicon dioxide and micronized amide wax | 0.5%-5% | wt.; |
| photoinitiator | 0.5%-5% | wt.; |
| coinitiator | 0.5%-3% | wt.; and |
| other additives | 0.1%-10% | wt.. |

10. The method according to claim 9, which further comprises using a preparation which comprises at least one of 0.3% to 2% wt. of a flow agent and lubricant and 0.1% to 1% wt. of an antifoam.

11. The method according to claim 1, which further comprises forming the plastic preparation to contain the filler selected from the group consisting of kaolin, talc, barium sulfate, titanium white, calcium carbonate and mica.

12. The method according to claim 1, which further comprises forming the plastic preparation to contain the filler selected from the group consisting of aluminum silicate hollow balls, expanded hollow balls, PU-softfeeling beads, micronized plastics, and PE waxes.

13. The method according to claim 12, which further comprises selecting the micronized plastics from the group consisting of polypropylene and PTFE.

* * * * *